W. H. FALLS.
NON-SKID CHAIN ATTACHMENT FOR RUBBER TIRED WHEELS.
APPLICATION FILED JAN. 25, 1917.
1,235,670.
Patented Aug. 7, 1917.
2 SHEETS—SHEET 1.
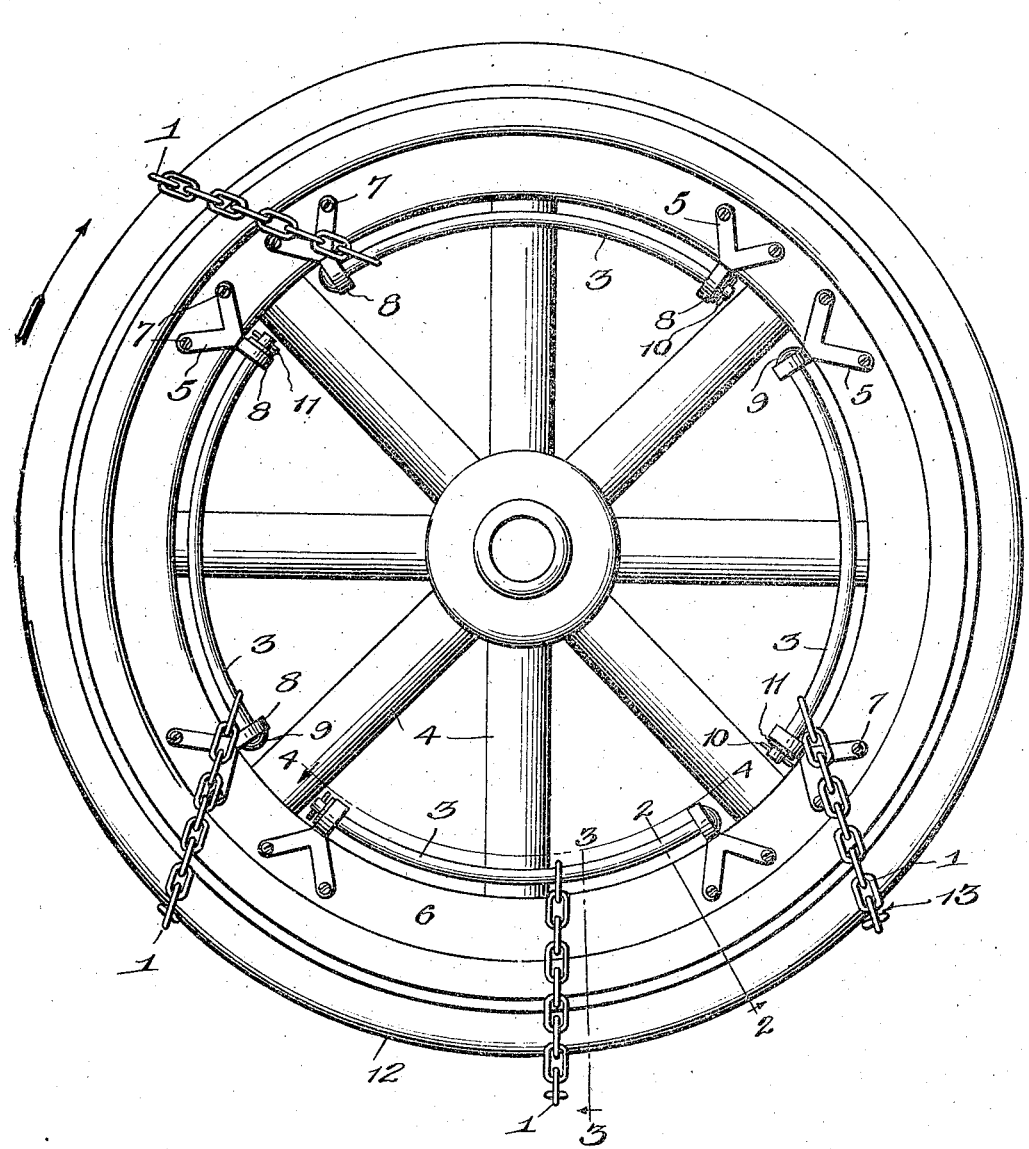
Inventor
William H. Falls.
Attorney W. H. FALLS.
NON-SKID CHAIN ATTACHMENT FOR RUBBER TIRED WHEELS.
APPLICATION FILED JAN. 25, 1917.
1,235,670.
Patented Aug. 7, 1917.
2 SHEETS—SHEET 2.
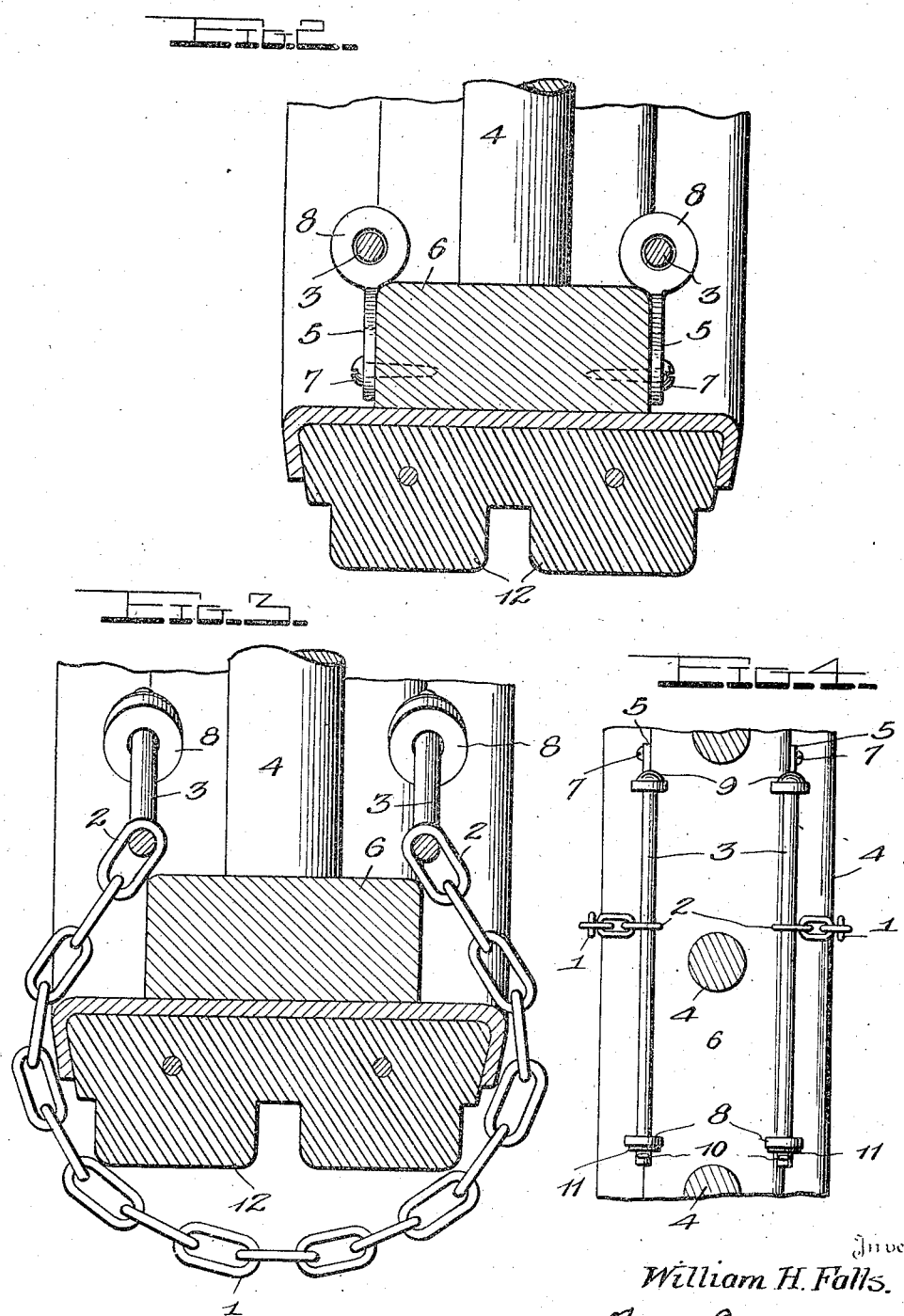
William H. Falls,

UNITED STATES PATENT OFFICE.

WILLIAM H. FALLS, OF BRIDGEPORT, CONNECTICUT.

NON-SKID CHAIN ATTACHMENT FOR RUBBER-TIRED WHEELS.

1,235,670.  Specification of Letters Patent.  Patented Aug. 7, 1917.

Application filed January 25, 1917. Serial No. 144,423.

*To all whom it may concern:*

Be it known that I, WILLIAM H. FALLS, a citizen of the United States, residing at the city of Bridgeport, county of Fairfield, State of Connecticut, have invented certain new and useful Improvements in Non-Skid Chain Attachments for Rubber-Tired Wheels; and I do declare the following to be a full, clear, and exact description of the invention, such as will enable others skilled in the art to which it appertains to make and use the same.

This invention relates to certain new and useful improvements in a non-skid chain attachment for rubber tired wheels, and it has for an object to provide a non-skid device wherein the chain anchoring means is permanently fixed to the wheel and detachably engaged with the chains.

A further object resides in a chain anchor with which the chain has limited sliding engagement whereby the chain will more efficiently grip the road-bed.

The invention further resides in the features of construction, and the arrangements and combinations of parts hereinafter described and claimed, reference being had to the accompanying drawing wherein—

Figure 1 is a side elevation of a wheel having non-skid attachments, embodying the present invention, thereon;

Fig. 2 is a fragmentary radial section on line 2—2 of Fig. 1 through the wheel and the chain anchors showing the mounting of the latter;

Fig. 3 is a similar view on line 3—3 of Fig. 1 showing a chain attached; and

Fig. 4 is a section on line 4—4 of Fig. 1 looking radially from within and showing the non-skid attachment in plan.

In the preferred embodiment, the invention comprises a series of chains 1, each of which has its end links 2 anchored to the arcuate guide rods 3 that are concentrically related with the wheel 4 and are arranged in peripherally spaced, coöperating pairs, the companion rods of each pair being mounted on opposite sides of the wheel, as depicted in Fig. 4.

Y-brackets 5 are provided for supporting the guide rods, each bracket having its arms secured to the felly 6, by fasteners 7, and a bearing or eye 8 extending inwardly therefrom through which the guide rod is inserted. Two brackets support each rod, one being arranged at each end, as shown.

One end of each guide rod is provided with a head 9 that abuts the adjacent bearing 8, whereas the opposite end is apertured to receive a cotter pin 10 which secures the rod against longitudinal displacement, a washer 11 being interposed between the cotter pin and the adjacent bracket.

The chains loosely embrace their anchors 3 and the tire 12, so that, in traveling, the chains will slide along the guide rods during contact with the road and when they are free of the latter they will slide by gravity first to one end of their anchor rods and then to the other. Thus, by the time the chain in contact with the road has been forced or dragged along the supporting rod to the end thereof, the next succeeding chain will have gravitated to the adjacent ends of its rods, as shown at 13, and thereby be in a position to immediately engage the road-bed and be dragged to the opposite ends of its rods. This affords a good traction and a non-skid attachment in which the sliding of the chains, while contacting the road, prevents injury to the tire and undue wear and strain on the chains.

The chains are easily removed by disengaging the cotter pins and then withdrawing the guide rods from the engaged links after which the rods may be re-positioned in their brackets or removed entirely. The chains are given a limited sliding movement and are at the same time securely anchored to the wheel.

The attachments, while especially adapted for truck wheels and heavy hauling, may obviously be applied to wheels of other vehicles.

What is claimed is:

1. In a non-skid device, the combination with a wheel, of a pair of brackets permanently fixed to each side thereof, each bracket having a bearing eye, an arcuate guide rod supported by each pair of brackets passed through the eyes of the latter and provided with a head on one end, a chain loosely embracing the wheel and having its ends slidably receiving the guide rods, and removable means on the opposite end of each rod holding the same against longitudinal displacement.

2. In a non-skid device, the combination with a wheel, of a pair of brackets permanently fixed to each side thereof, each bracket having a bearing, an arcuate guide rod removably mounted on the bearings of each pair of brackets, and a chain having its end links slidable loosely on the guide rods.

3. In combination, a wheel, a plurality of spaced concentrically arranged anchor means fixed thereon to opposite sides thereof, and a plurality of spaced traction chains loosely embracing the wheel and having their respective ends slidingly engaged with the anchor means for limited peripheral movement.

In testimony whereof I affix my signature in presence of two witnesses.

WILLIAM H. FALLS.

Witnesses:
F. W. SMITH, Jr.,
M. T. LONGDEN.